United States Patent [19]

Ide

[11] Patent Number: 4,636,070
[45] Date of Patent: Jan. 13, 1987

[54] APPARATUS FOR MEASURING THE CUT-OFF WAVELENGTH OF A SINGLE-MODE OPTICAL FIBER

[75] Inventor: Takashi Ide, Kanagawa, Japan

[73] Assignee: Sumitomo Electric Industries, Ltd., Osaka, Japan

[21] Appl. No.: 797,667

[22] Filed: Nov. 13, 1985

[30] Foreign Application Priority Data

Nov. 26, 1984 [JP] Japan ................................ 59-249248

[51] Int. Cl.⁴ .......................................... G01N 21/84
[52] U.S. Cl. ............................................. 356/73.1
[58] Field of Search ..................................... 356/73.1

[56] References Cited

U.S. PATENT DOCUMENTS

4,468,117  8/1984  Hartouni ............................ 356/73.1

Primary Examiner—Vincent P. McGraw
Attorney, Agent, or Firm—Cushman, Darby & Cushman

[57] ABSTRACT

An apparatus for measuring the cut-off wavelength of a single-mode optical fiber includes two fiber bending devices one of which provides the fiber, during test, with a large radius bend and the other of which provides the fiber, during test, with a small radius bend. The outputs from the fiber during the large and small radius bending are compared in order to precisely measure the cut-off wavelength.

7 Claims, 10 Drawing Figures

APPARATUS FOR MEASURING THE CUT-OFF WAVELENGTH OF A SINGLE-MODE OPTICAL FIBER

FIELD OF THE INVENTION

The invention relates to an apparatus capable of precisely measuring the cut-off wavelength of a single-mode optical fiber in an easy and labor-saving manner.

BACKGROUND OF THE INVENTION

1. The principles of measuring the cut-off wavelength of a single-mode optical fiber by the "bend method" are described below.

Figure 9:
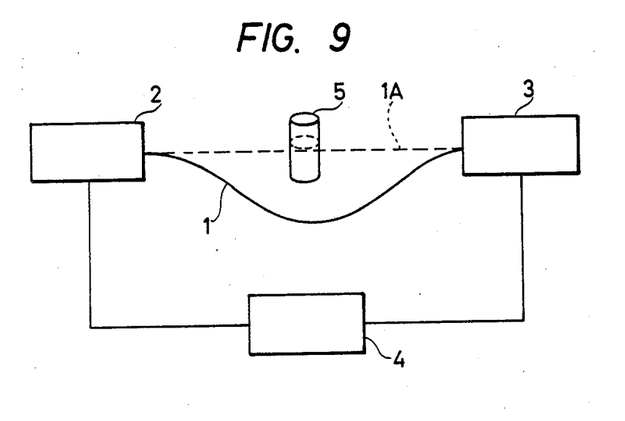
FIG. 9 shows schematically the basic principles of measuring the cut-off wavelength of a single-mode optical fiber by the "bend method"

The cut-off wavelength is an important parameter of a single-mode optical fiber and means the limit wavelength at which the fiber operates in a single mode without propagating light in more than one mode. It is therefore very important to make precise measurements of this cut-off wavelength. One of the techniques extensively used to determine the cut-off wavelength is called the "bend method" and is shown in FIG. 5.4.29 on page 437 of "Hikari Tsushin Handbook (Handbook of Lightwave Communications)", Asakura Shoten, Sept. 1, 1982. A typical apparatus employed in implementing this method is shown in FIG. 9, where optical fiber 1 of a suitable length whose cut-off wavelength is to be measured is coupled between light source 2 capable of producing varying wavelengths and optical detector 3. Both light source 2 and optical detector 3 are connected to control/calculation unit 4.

The measurement of cut-off wavelength by the bend method proceeds as follows. First, the light issuing from source 2 is swept over a certain range of wavelength, say, 0.95–1.45 μm, under the control of unit 4 with fiber 1 being held in an unbent or slack condition as indicated by the solid line in FIG. 9. Optical power output P1 (λ) from fiber 1 at each of the wavelengths used is detected by detector 3 and stored in unit 4.

Next, fiber 1 is wound around mandrel 5 with a suitable diameter as indicated by dashed line 1A in FIG. 9, with care taken not to cause a change in the state of coupling of fiber 1 to either light source 2 or detector 3. With the equipment set in this way, the light issuing from source 2 is swept over the same range of wavelength as used in the first detection, under the control of unit 4, and optical power output P2 (λ) from fiber 1 at each of the wavelengths used is detected by detector 3 and stored in unit 4.

The ratio between transmission powers P1 and P2 may be calculated as follows:

$$R(\lambda) = 10 \log \left( \frac{P1(\lambda)}{P2(\lambda)} \right). \tag{1}$$

Figure 10:
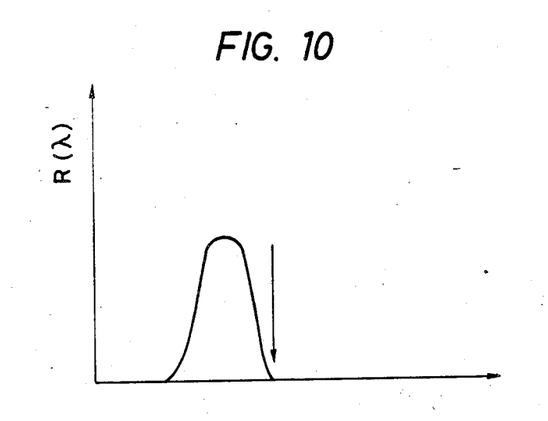
FIG. 10 is a graph showing an example of the data that is obtained by measuring the cut-off wavelength of a single-mode optical fiber by the "bend method".

Based on the data obtained by this calculation, a graph is prepared that shows the wavelengths characteristics of the fiber, or the wavelength dependency of bend loss, as shown in FIG. 10. The cut-off wavelength may be determined from this graph as the rise point of the bend loss.

2. Problems with the measurement of the cut-off wavelength of a single-mode optical fiber by the "bend method" are now described.

The conventional equipment for measuring the cut-off wavelength of a single-mode optical fiber by the "bend method" described above has the following problems in terms of precision and ease of measurement. First of all, the precision of the measurement of the cut-off wavelength is highly sensitive to any change that may occur in the state of coupling of the fiber at both ends when a bend is given to the fiber and great care must be taken to avoid the occurrence of such change. If there occurs any change in the state of coupling of the fiber at either end, the amount of light that enters the optical detector will vary irrespective of the wavelength dependency of the fiber.

For implementing the "bend method" described above, if the fiber is wound around the mandrel so that the fiber fixed at both ends in the "state where no bend is given to the fiber" is put into the "state where a bend is given to the fiber", the fiber inevitably experiences a "torsion" or rotation of the fiber around its central axis. Coated optical fibers generally have a tendency to restore easily from torsion, so the torsion that has occurred in the fiber introduces a change in the state of coupling of the fiber at both ends, thus degrading the precision of measurement of the cut-off wavelength of that fiber.

Furthermore, the coated optical fiber also has a tendency to restore from a bend. Therefore, the fiber simply wound around the mandrel has a rather instable attitude and requires some fixated treatment such as by securing the fiber with adhesive tape. Such treatment, however, not only reduces the ease of measurement, but also causes microbending or other bends that may adversely affect the precision of measurement at the fixed ends of the fiber.

As a further problem, the "bend method" described above has low reliability of measurement because of the low reproducibility and stability of the "state where no bend is given to the fiber." The first reason for this problem is that the meaning of the "state where no bend is given to the fiber" has not so far been clearly defined, and it has been entirely left to the discretion of a specific organizational or individual experimenter to decide as to how the optical fiber should be placed to obtain this state. As a consequence, the "state where no bend is given to the fiber" has differed from one experimenter to another or between runs of measurement. Secondly, with the fiber put in a slack condition as shown in FIG. 9, the slightest change in the state of the fiber will cause a considerable change in the measurement data.

Under these circumstances, the International Telegraph and Telephone Consultative Committee (CCITT) proposed "Revised Version of Recommendation G652 Characteristics of A Single Mode Fiber Cable" in May 1984. On pages 15–18 of this paper, the CCITT proposed that the cut-off wavelength of a single-mode fiber be measured by making comparison of the wavelength dependency between the "state where no bend is given to the fiber" and the "state where a bend is given to the fiber" in accordance with the conventional method except that the respective states are replaced by application of two bends having different radii of curvature, one having a larger radius-of-curvature, say a diameter of 280 mm, and the other having a smaller radius-of-curvature, say, a diameter of 60 mm. Further conditions of measurement that are considered necessary and sufficient by the recommendations are as follows: when a bend with the larger radius-of-curvature is applied, care shall be taken to avoid any bends of radius smaller than the radius selected and the portion to be bent shall be equivalent to a loop having the circumference calculated from the radius selected; and when a bend with the smaller radius-of-curvature is applied, care shall be taken to avoid any bends of radius smaller than the small radius selected and the portion to be bent shall be equivalent to a loop having a circumference not smaller than that calculated from the radius selected.

The method of measurement recommended by the CCITT ensures the high reproducibility and stability of the "state where no bend is given to the fiber", thereby eliminating the possibility of low reliability of measurement that will otherwise occur when no such high reproducibility and stability are ensured.

However, the method recommended by the CCITT still imparts a bend to the fiber under test by the conventional technique of winding the fiber around a mandrel and, so long as this technique is employed, the problems arising from torsion that develops in the fiber and its restoring force cannot be solved. A torsion applied to the fiber under test causes a change in the state of coupling of the fiber at both ends. In addition, because of the force of restoration from a bend applied to a coated fiber, the latter is unable to have a stable attitude if it is simply wound around a mandrel and must be fixed by some means, such as by securing with adhesive tape. This fixing operation requires careful winding of the fiber around a mandrel with a diameter of as large as 280 mm so that the wound fiber will not come loose. In addition, microbending and other bends that will adversely affect the precision of measurement may occur as a result of attachment of the adhesive tape.

With the rapidity of the recent advancement of fiber optics technology, mass production of optical fibers with high quality has become possible. This has required the inspection of fiber products with higher precision and efficiency, and this demand is particularly urgent for single-mode optical fibers with respect to the measurement of cut-off wavelength which is one of the most important parameters of such fibers.

The conventional apparatus for measuring the cut-off wavelength of a single-mode fiber has not been designed in consideration of its size or space factor. The equipment therefore is large in size and the operator finds considerable difficulty in measurement because of the large space that has to be covered during operation of the equipment. In addition, the operator must repeat the winding of the fiber around a mandrel with a suitable diameter for each run of measurement whether the purpose is to produce the "state where no bend is given to the fiber" or the "state where a bend is given to the fiber". In either operation, that portion of the fiber which is not wound around the mandrel must be maintained in a straight or unbent state, and in order to meet this requirement, the operation has to employ a suitable adjusting means such as the moving of junction points so that any insufficiency of the fiber length or sag that will occur as a result of rewinding the fiber around a mandrel with a different diameter may be compensated. However, this may introduce a change in the state of fiber connection at the junction points or a movement of the fiber on either the light source or optical detector side, thereby causing adverse effects on the precision of measurement such as a change in the state of fiber excitation.

SUMMARY OF THE INVENTION

The primary object, therefore, of the present invention is to provide an apparatus for measuring the cut-off wavelength of a single-mode optical fiber that is free from the problem of torsion development and is capable of imparting a bend to the fiber in a stable attitude during measurement and which ensures simple and continuous realization and maintenance of both the "state where no bend is given to the fiber" and the "state where a bend is given to the fiber", once the fiber under test is set in the apparatus, thereby assuring high precision of measurement and enabling improved and efficient operations of measurements.

In order to attain this object, the invention provides an apparatus for measuring the cut-off wavelength of a single-mode optical fiber that includes a light source that is designed to be connected to one end of the single-mode fiber to be tested and which is capable of emitting light having varying wavelengths and an optical detector connected to the other end of the fiber. The invention measures the cut-off wavelength of the fiber by comparing an optical output obtained at the other end of the optical fiber when a bend having a larger radius-of-curvature is given to the fiber with an optical output obtained at the other end of the fiber when a bend of a smaller radius-of-curvature is given to the fiber. The apparatus according to the invention further includes two fiber bending units that provide the fiber, under test between the light source and the optical detector, with arched bends having different radii of curvature.

The first fiber bending unit provides the bend with the larger radius-of-curvature and includes two larger radius-of-curvature bend imparting members having arched curved surfaces with the same radius-of-curvature, the members being arranged so that they have two common parallel tangents and that the tangent to a bend at the point where it starts to be applied to the fiber by one of the members is collinear with the tangent to a bend at the point where it starts to be applied to the fiber by the other member. One of the larger radius-of-curvature bend imparting members is fixed whereas the other member is movable in a direction parallel to the tangents. The other larger radius-of-curvature bend imparting member is provided with a tension imparting unit that applies a biasing force in a direction that is parallel to the tangents and which departs from the one larger radius-of-curvature bend imparting member. The two larger radius-of-curvature bend imparting members are constructed so that they will bend the fiber under test into a taut loop. The minimum radius-of-curvature applied to the fiber under test is equal to the radius of the arched curved surface, and the length of that portion of the fiber which is bent with the radius of the arched curved surface is equal to the circumference of a single circle having the radius of the arched curved surface. The second fiber bending unit provides the bend with the smaller radius-of-curvature and is constructed so that it will press an arched curved surface, having the small radius-of-curvature, against the fiber under test, thereby providing the necessary amount of bend.

The measurement of transmitted power from a single-mode optical fiber in the "state where no bend is given to the fiber", using the invention described above, will now be given. First, a given length of optical fiber to be tested is connected between the light source and the optical detector. The fiber is then wound around the pair of larger radius-of-curvature bend imparting members constituting the first bending unit. One of the larger radius-of-curvature bend imparting members, which is movable, is provided with the tension imparting unit, described above, which causes the member to move in such a direction that it will depart away from the other larger radius-of-curvature bend imparting member which is fixed. As a result, optical fibers to be tested which may somewhat vary in length will automatically be held taut by a suitably slight degree irrespective of their length.

By these procedures, the fiber under test is bent into a taut loop between the light source and the optical detector. The radius-of-curvature of the looped bend is equal to the radius of the arched curved surface formed by each of the larger radius-of-curvature bend imparting members and the length of that portion of the fiber that is bent into a loop with the radius of the arched curved surface is equal to the circumference of a single circle having the radius of the arched curved surface.

Therefore, the fiber under test is subjected to the same amount of bend as would be applied when it is wound around a cylinder having a curvature equal to that of the looped bend. The fiber having the looped bend is fixed at both ends, but since the tension imparting unit enables the fiber under test to be held taut by a suitably slight degree around the larger radius-of-curvature bend imparting members, any torsion that has developed in the fiber will not be transmitted to either end of the fiber in a sufficient amount to cause an unwanted change in the state of coupling of the fiber with the light source or optical detector.

In addition, the movable larger radius-of-curvature bend imparting member of the first fiber bending unit is moved by the tension imparting unit in a direction parallel to the tangents of the two larger radius-of-curvature bend imparting members, whereby the fiber under test is held taut by a suitably slight degree. As a result, the fiber under test can be maintained in a very stable state during measurement without securing the fiber to the bend imparting members with, for example, adhesive tape in order to counteract the restoring force of the fiber. The entire absence of the need for securing the fiber with adhesive tape or other fastener will considerably simplify the setting up operation of the apparatus and avoid the occurrence of any bend that may cause adverse effects on the intended measurement.

As a further advantage, the fiber under test is wound around the pair of larger radius-of-curvature bend imparting members, so the span of the fiber under test can be limited to a relatively small range.

After setting up the first fiber bending unit in the manner described above, the second fiber bending unit is then operated to impart to the fiber the bend with the smaller radius-of-curvature, thereby realizing the "state where a bend is given to the fiber". This provides a very simple shift from the "state where no bend is given to the fiber" to the "state where a bend is given to the fiber", and power outputs from the two states can be measured continuously.

As mentioned above, the second fiber bending unit merely presses an arched curved surface with the smaller radius-of-curvature against the fiber and will not cause any torsion in the latter. While it is in operation, the second fiber bending unit will pull the fiber under test but at the same time, a corresponding amount of fiber is delivered by the movable larger radius-of-curvature bend imparting member of the first fiber bending unit which will be displaced toward the fixed, other larger radius-of-curvature bend imparting member so as to counteract the the tension applied by the tension imparting unit. As a result, no excessive force will act on the fiber under test and the latter is continuously held taut by a suitably slight degree.

DETAILED DESCRIPTION OF THE INVENTION

Preferred embodiments of the apparatus of the present invention for measuring the cut-off wavelength of a single-mode optical fiber are hereunder described with reference to the accompanying drawings.

Figure 1:
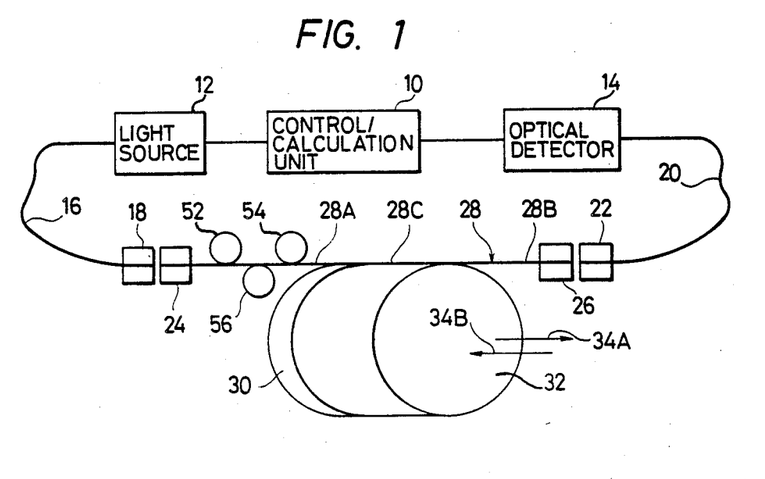
FIG. 1 is a line diagram showing schematically one embodiment of the apparatus of the present invention for measuring the cut-off wavelength of a single-mode optical fiber, wherein a bend having a larger radius-of-curvature is imparted to the fiber under test.
Figure 2:
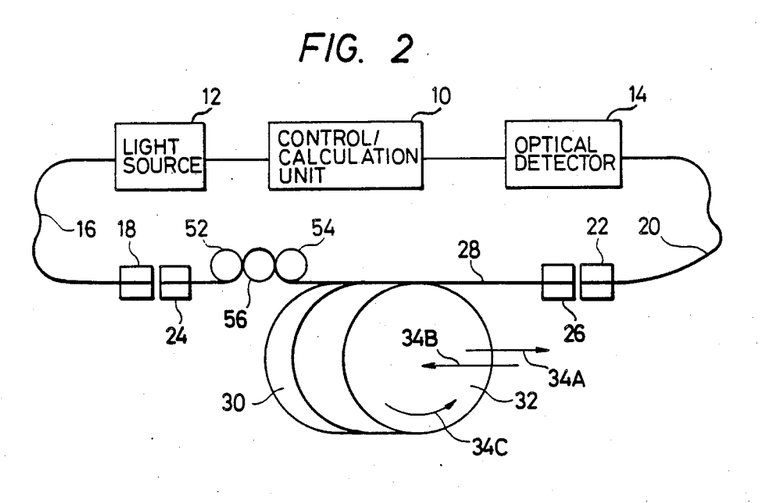
FIG. 2 is a line diagram showing schematically the apparatus of FIG. 1 in the other state where a bend having a smaller radius-of-curvature is imparted to the fiber under test.

FIGS. 1 and 2 are line diagrams showing schematically one embodiment of the apparatus of the present invention for measuring the cut-off wavelength of a single-mode optical fiber. FIG. 1 shows the state where a bend with the larger radius-of-curvature is being given to the fiber under test, and FIG. 2 shows the state where a bend with the smaller radius-of-curvature is given to the fiber.

The apparatus shown in FIGS. 1 and 2 includes control/calculation unit 10, light source 12 that is capable of issuing light at varying wavelengths under the control of unit 10, and optical detector 14 whose output is connected to unit 10. The light source 12 may be composed of a semiconductor laser capable of emitting light having varying wavelengths. Alternatively, source 12 may be composed of a white light source and a spectroscope, the latter being controlled by unit 10. An optical fiber 16 connected to light source 12 is retained by holder 18 while an optical fiber 20 extending to the detector 14 is retained by holder 22.

The fiber holders 18 and 22 are respectively disposed in a face-to-face relation with holders 24 and 26 for retaining the optical fiber to be tested. The holders 24 and 26 are designed to grip fiber 28 under test by a sufficient strength to prevent fiber 28 from slipping out of the holders even if some amount of tensile force is exerted on the fiber. The positions of holders 24 and 26 may be finely adjusted in both x- and y-directions that intersect with each other at right angles in directions perpendicular to the optical axis of fiber 28, as well as in the z-direction which is parallel to that optical axis.

The first fiber bending unit that will provide a bend having the larger radius-of-curvature to fiber 28, which is retained at the two ends by the holders 24 and 26, and the second fiber bending unit that will provide a bend having the smaller radius-of-curvature to fiber 28 are disposed between the holders 24 and 26.

The first fiber bending unit (used to provide the larger radius-of-curvature to fiber 28) has a pair of larger radius-of-curvature bend imparting members each having a curved surface with a radius-of-curvature of, for example, 280 mm. One of the two larger radius-of-curvature bend imparting members is crescent member 30 and the other member is large roller 32. The crescent member 30 and large roller 32 have two common tangents which are parallel to each other and one of the tangents lies in an extension of that part of optical fiber 28 which is retained in holders 24 and 26. This arrangement prevents optical fiber 28 from bending either at the boundary between that part of the fiber under test which is retained in holder 24 and portion 28A of the fiber lying between crescent member 30 and holder 24 or at the boundary between that part of the fiber under test which is retained in holder 26 and portion 28B of the fiber lying between large roller 32 and holder 26. The portions 28A and 28B of the fiber are collinear with 28C which is one of the two common tangents between crescent member 30 and large roller 32.

The crescent member 30 which is one of the two members that provide fiber 28 with a bend having the larger radius-of-curvature is held fixed so that it will not be displaced in positon. The structure of large roller 32 which is the other member of the first fiber bending unit is not shown in detail in FIGS. 1 or 2, but it is disposed to be movable in directions 34A and 34B that are parallel to portions 28A, 28B and 28C of the optical fiber under test. The large roll 32 is provided with a tension imparting unit that imparts a predetermined amount of tension in the direction of 34A, departing away from the crescent member 30.

Figure 3:
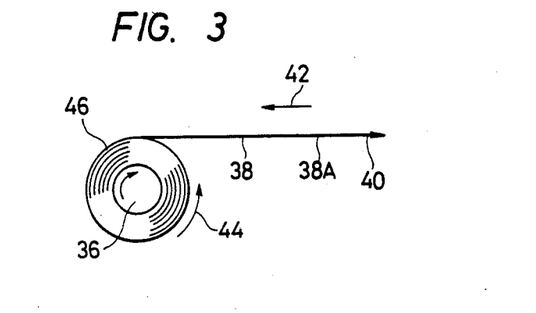
FIG. 3 shows schematically one embodiment of the tension imparting unit that provides the large roller with a given tensile force.

The tension imparting unit of this type is most readily constructed by a "constant load spring" as shown schematically in FIG. 3. The "constant load spring" is made of leaf spring 38 having one end 38A attached to, for example, the rotational axis of large roller 32 in FIG. 1 and the other end wound tightly around drum 36 in a coil form. The drum 36 is held rotatable at a fixed point distant from large roller 32 in the direction 34A.

The operation of the "constant load spring" will now be described. When leaf spring 38 is pulled in the direction indicated by arrow 40, the drum rotates to develop a tensile force in the direction indicated by arrow 42. If drum 36 having a momentum to rotate in the direction indicated by arrow 44 is left to rotate freely, it continues to develop a constant amount of tensile force in the direction indicated by arrow 42 irrespective of the amount by which leaf spring 38 is pulled. The amount of the tensile force is constant because the component of force that is tangent to the leaf spring develops only in area 46 where the spring deforms.

Figure 4:
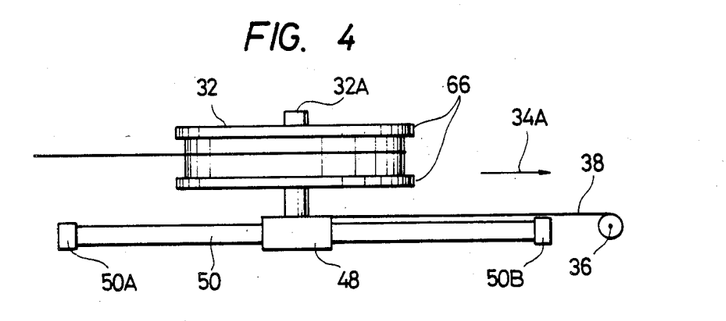
FIG. 4 shows schematically a large roller guiding mechanism and the tension imparting unit.

FIG. 4 is a side view of large roller 32 which is combined with the tension imparting unit comprised of the "constant load spring" described above. In FIG. 4, large roller 32 is supported rotatably on roller shaft 32A which is supported on supporting block 48. The block 48 is slidable on slide shaft 50 that has stoppers 50A and 50B on two ends and which extends in the direction 34A shown in FIG. 1. This arrangement enables large roller 32 to slide in en masse in the direction 34A. To support block 48 is fixed one end of the "constant load spring" described above. The drum 36 of the "constant load spring" is held on a position distant from large roller 32 in the direction 34A. The "constant load spring" pulls large roller 32 in the direction indicated by the arrow 34A so that the fiber under test may be maintained taut by a suitably slight degree that will not adversely affect the intended purpose of measurement. More specifically, large roller 32 is pulled by the "constant load spring" so that a constant amount of tensile force within the range of, say, 10–50 g, is exerted on the fiber under test.

The second fiber bending unit is used to provide optical fiber 28 with a bend having the smaller radius-of-curvature, and this unit has a smaller radius-of-curvature bend imparting member that is composed of three small cylindrical rollers 52, 54 and 56 that have the same small radius-of-curvature of, for example, 60 mm in diameter and which are disposed between holder 24 and crescent member 30. The small rollers 52 and 54 are positioned on one side of fiber 28 and are placed in contact therewith so that they will impart no bend to fiber 28. The small rollers 52 and 54 are spaced by a distance twice the radius-of-curvature of each roller.

The remaining small roller 56 is positioned opposite the small rollers 52 and 54 with respect to fiber 28. As shown in FIG. 2, roller 56 is capable of pushing fiber 28 and intruding into the space between rollers 52 and 54 up to a point where the centers of the circles defined by the three rollers, 52, 54 and 56 lie in the same straight line or even further beyond said point.

With the arrangement of the small rollers 52, 54 and 56 shown above, optical fiber 28 is not given a bend with the smaller radius-of-curvature when the small rollers are in the positions shown in FIG. 1, and the fiber is given a bend with the smaller radius-of-curvature when the rollers are at the positions shown in FIG. 2. By properly adjusting the degree by which small roller 56 intrudes into the space between the other rollers 52 and 54, each of rollers 52 and 54 provides fiber 28 with a bend whose length is equal to one quarter of the circumference of a circle having the smaller radius-of-curvature while roller 56 provides a bend whose length is equal to one half the circumference of the same circle.

When small roller 56 intrudes into the space between rollers 52 and 54, fiber 28 is stretched and the resulting tension acting on the fiber will displace the large roller 32 in the direction 34B to counteract the force applied by the tension imparting unit, thus causing the fiber 28 to be delivered toward the small rollers.

Figure 5:
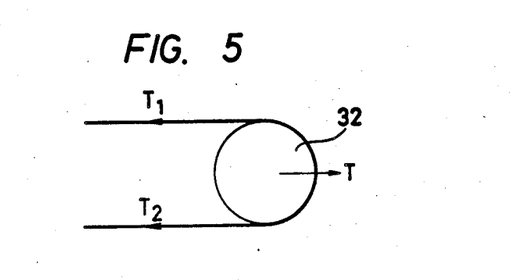
FIG. 5 is a diagram that illustrates the components of a tension acting on the fiber under test that is wound around the large roller.

If none of small rollers 52, 54 and 56 and large roller 32 are rotatable, the fiber under test may be abraded by the surfaces of small rollers 54 and 56 and large roller 32 when small roller 56 intrudes into the space between small rollers 52 and 54. In order to avoid this problem, small rollers 54 and 56 and large roller 32 are made freely rotatable around their own central axis. The smoothly rotatable small rollers 54 and 56 and large roller 32 are effective in applying a constant amount of tension to the fiber under test. When a tension is applied to large roller 32, as shown in FIG. 5, two tensile components T1 and T2 develop in the fiber wound around large roller 32. If small rollers 54 and 56 and the large roller 32 are smoothly rotatable, T1 is approximately equal to T2 and a uniform tension is exerted on the entire length of the fiber under test.

The apparatus described above for measuring the cut-off wavelength of a single-mode optical fiber may be used as follows. The measurement of the cut-off wavelength of a single-mode fiber proceeds in a sequence of steps, i.e., the setting up of the fiber to be tested, imparting to the fiber a bend with the larger radius-of-curvature, and imparting to the fiber a bend with the smaller radius-of-curvature. Therefore, the following description is based on the sequence of such steps.

First, the experimenter places the small roller 56 in its first position shown in FIG. 1. He then sets the two ends of optical fiber 28 of a given length, for example 2 m, in respective holders 24 and 26 and winds the middle of fiber 28 around crescent member 30 and large roller 32. As already described, large roller 32 is subjected to a tensile force in the direction 34A and is rendered to be capable of displacement, so fiber 28 is automatically held taut by a suitably slight degree.

As a result of the above step, portions 28A, 28B and 28C of fiber 28 are put in the same straight line and both crescent member 30 and large roller 32 provide fiber 28 with a bend whose length is equal to half the circumference of the circle defined by the periphery of each member, thereby producing a bend equivalent to the circumference of one circle formed by the periphery of large roller 32.

The above procedure causes the fiber 28 to be bent in a loop form but, since the fiber is immediately made slightly taut around crescent member 30 and large roller 32, the amount of "torsion" that may occur in the fiber and will be transmitted to either end of the fiber is negligible. Therefore, the state in which fiber 28 is held in position by holders 24 and 25 will not experience any "torsion"-induced change.

With fiber 28 adjusted to the state described above, light having a specific wavelength is issued from light source 12 and the transmitted power is detected by optical detector 14. The output of detector 14 may be maximized by finely adjusting holders 24 and 26 in the x-, y- or z-directions. As a result, the distance between one end of fiber 28 and the end of fiber 16 and the distance between the other end of fiber 28 and the end of fiber 20 are each adjusted to the range of several tens of micrometers, and at the same time, the optical axis of fibers 16 and 20 are brought into alignment with the optical axis of fiber 28 under test.

In the state described above (and shown in FIG. 1), the light from source 12 is swept over the predetermined range of wavelength, for example, 1.00–1.40 μm, under the control of control/calculation unit 10, and the optical power P1 (λ), for each of the wavelengths used, that has been transmitted through fiber 28 and which has been detected by detector 14 is stored in the unit 10.

The above procedures complete the measurement of the optical output obtained when a bend with the larger radius-of-curvature has been applied to the fiber under test.

Next, the experimenter pushes small roller 56 together with fiber 28 so that the roller is intruded into the space between the other small rollers 52 and 54 up to a point where the centers of the circles defined by the respective small rollers lie in the same straight line or further than this point. As a result, fiber 28 is provided with a bend equivalent to the circumference of one circle having the smaller radius-of-curvature as shown in FIG. 2.

As already mentioned, when small roller 56 is being pushed into the space between small rollers 52 and 54, rollers 54 and 56, as well as large roller 32 rotate on their axis and only a negligible amount of frictional force will act on the fiber under test. The fiber 28 is also stretched when small roller 56 is intruding into the space between small rollers 52 and 54, but no excessive tension will be applied to fiber 28 since large roller 32 is displaced in the direction 34B to counteract the tension imparting unit and deliver a certain length of fiber 28 toward the small rollers. At the same time, large roller 32 is stretched by the tension imparting unit in the direction 34A, so fiber 28 is maintained in the initial slightly taut state.

In the state described above (and shown in FIG. 2), the light from source 12 is swept over the same range of wavelength as used in the measurement of P1, i.e., 1.00–1.40 μm, under the control of unit 10, and the optical power P2 (λ) at each of the wavelengths used that has been transmitted through fiber 28 and which has been detected by detector 14 is stored in unit 10.

By the above procedures, the wavelength characteristics of the outputs of light that has propagated through fiber 28 in the two different states can be measured. The unit 10 then calculates R (λ) by formula (1) set forth above, and on the basis of the calculated R (λ), the cut-off wavelength of the fiber under test is determined.

While the apparatus of the present invention is performing the sequence of steps described above for measuring the cut-off wavelength of a single-mode optical fiber, the large roller and the small rollers make smooth rotation and the tension imparting unit generates a constant amount of tension. As a result, the amount of tension being exerted on the fiber under test is held constant and the fiber is capable of smooth movement.

The arrangement of the small rollers shown in the illustrated embodiment ensures smooth movement of the fiber under test for two reasons: first, the fiber is not excessively stretched by the bend formed by said small rollers, and second, small rollers 52 and 54 are held in contact with the fiber under test. In addition, small roller 56 is the only member that moves while a bend with the smaller radius-of-curvature is imparted to the fiber under test and the minimum amount of movement that must be made by that small roller is approximately equal to its diameter, which is quite advantageous for the purpose of efficient operation of the apparatus. Furthermore, the second fiber bending unit that provides a smaller radius-of-curvature bend for the fiber occupies a very small space, which is equivalent to four small rollers.

Figure 6:
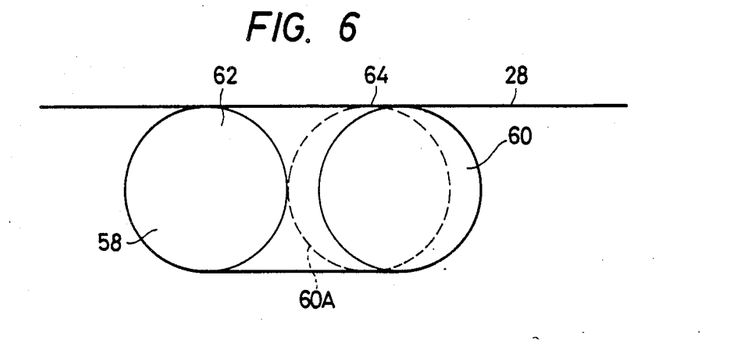
FIG. 6 shows schematically another embodiment of the fiber bending unit that imparts a bend with the larger radius-of-curvature.

Further discussion is hereunder made of the shape of the larger radius-of-curvature bend imparting unit. As shown in FIGS. 1 and 2, large roller 32 which is one of the two larger radius-of-curvature bend imparting members of the first fiber bending unit has a circumference equal to that one complete circle defined by that roller. On the other hand, crescent member 30 which is the other member of the first fiber bending unit has a concave edge that defines part of a circle for the specific purpose of expanding the range of movement of large roller 32. In the absence of such a concave edge, the first fiber bending unit would be composed of two large rollers 58 and 60, as shown in FIG. 6. If fiber 28, under test, is held taut around these rollers, the length of the fiber required to span them would be increased.

However, the larger radius-of-curvature that can be given to the fiber under test and the length of the latter are generally limited. For example, the CCITT recommended in the "Revised Version of Recommendation G652 Characteristics of A Single Mode Fiber Cable" in May 1984 that the larger bend should have a radius-of-curvature of 140 mm and the fiber to be tested should have a length of 2 m. When these recommendations are applied to the roller arrangement shown in FIG. 6, and if one large roller 60 is brought into closest position 60A to large roller 58 which is indicated by the dashed line in FIG. 6, the length of that portion of the fiber which is wound around the large rollers, namely, the length of the fiber that starts at point 62 past point 64 and runs around rollers 60 and 58 to return to point 64 past point 62, is approximately 1.72 mm. This means a remaining allowance of only 0.28 m for the 2 m fiber. It would not be impossible to apply a bend with the smaller radius-of-curvature under such condition, but then very little space is left for permitting the fiber to be connected to the holders. It should also be noted that the length of the fiber under test is not exactly 2 m and, in actual operations, the fiber length always involves a certain amount of error, which is typically about 0.2 m (in this respect, see Proceedings of SPIE—The International Society for Optical Engineering—, Volume 425, 'Single Mode Optical Fibers', "industrialized measurement system for single mode fibers", D. J. Eccleston and J. M. Dick, pp. 50–51).

In view of the above discussion, using a crescent member as one of the two larger radius-of-curvature bend imparting members as shown in FIGS. 1 and 2 is advantageous for two reasons: first, a single-mode optical fiber under test with a length of 2 m can be set up on the apparatus for measuring the cut-off wavelength of the fiber; second, two bends with different radii of curvature, one having a radius of 140 mm and the other having a smaller radius, can be imparted to the fiber under test. Therefore, it can be concluded that the arrangement shown above, in FIGS. 1 and 2, of the two larger radius-of-curvature bend imparting members is very effective for accomplishing the objects of the present invention.

Figure 7:
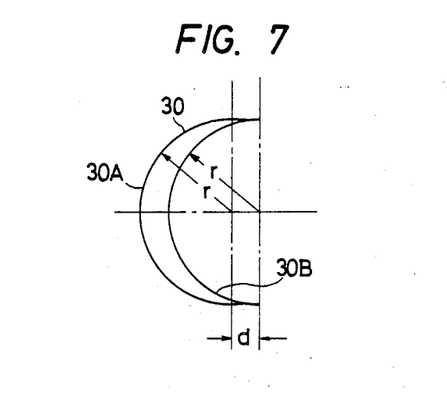
FIG. 7 shows schematically exemplary radii of curvature for the convex and concave edges of the crescent member.

An embodiment of crescent member 30 is illustrated in FIG. 7. Suppose that both convex edge 30A and concave edge 30B of crescent member 30 have an equal radius-of-curvature "r" except that the centers of the imaginary circles formed by the respective edges are offset by a distance "d". With this arrangement, convex edge 30A provides a bend with the desired larger radius-of-curvature while concave edge 30B will expand the range of movement of large roller 32 which is the other large radius-of-curvature bend imparting member. If the offset distance "d" is reduced to the smallest value that can be realized by workmanship, the circumference defined by the combination of the two large radius-of-curvature bend imparting members (i.e., crescent member 30 and large roller 32) becomes nearly equal to $2\pi r$ when the two bend portions are brought into close proximity with each other, and as a result, the fiber length that is lost by the bend can be reduced to a minimum level.

The setup of the unit for imparting a bend with the smaller radius-of-curvature to the fiber under test is hereunder described. In the embodiment of the apparatus for measuring the cut-off wavelength of a single-mode optical fiber that is illustrated in FIGS. 1 and 2, the unit composed of the small rollers 52, 54 and 56 is positioned between the fiber holder 24 and the crescent member 30. With this arrangement, if the large roller 32 is rotatable, the operation of providing the smaller bend can be performed smoothly because the fiber length necessary for the small rollers to accomplish this operation is delivered by the displacement of the large roller 32 in the direction 34B and the rotation of the same roller in the counterclockwise direction 34C. In addition, the small rollers 52 and 54 as well as the crescent member 30 are fixed, so by disposing the small roller 54 at a position close to where crescent member 30 starts to impart a bend to fiber 28, under test, a sufficiently large space to permit easy operation is provided in areas around fiber holders 24 and 26.

For example, if small rollers 52, 54 and 56 have a diameter of 60 mm as mentioned earlier in this specification, the distance between the two points of fiber 28 in contact with small rollers 52 and 54 is 120 mm. In this case, if the small roller 56 is pushed into the space between the small rollers 52 and 54, the length of the fiber 28 between these two points of contact is about 189 mm. In other words, even if a bend with the smaller radius-of-curvature is imparted to the fiber under test by the smaller radius-of-curvature bend imparting unit composed of small rollers 52, 54 and 56, fiber 28, under test, is stretched by a length of only about 69 mm. Therefore, even in the case of testing an optical fiber having a relatively short length, the necessary range of movement of large roller 32 can be reduced while increasing the range of the fiber length that can be effectively used for measurement purposes.

As shown in FIG. 4, large roller 32 may be provided with a flange 66. The crescent member 30 may also be provided with a similar flange. These flanges will facilitate the operation of winding fiber 28 around crescent member 30 and large roller 32.

In the illustrated apparatus for measuring the cut-off wavelength of a single-mode optical fiber, both fiber holders 24 and 26 are positioned in the same straight line on one side of the fiber loop formed by crescent member 30 and large roller 32, and this arrangement as combined with the wide space allowed for the areas around holders 24 and 26 will further increase the ease of operations that are involved during the equipment setup and cut-off wavelength measurement. If an air cylinder or other suitable means are used to automate the movement of small roller 56, the only manual job that is left for the experimenter is to set up the fiber to be tested, and the rest of the operations can be automatically performed to further improve the overall efficiency of measurement. If this is realized, one experimenter may be assigned to the operation of two or more apparatuses.

In accordance with the CCITT's recommendations, the larger and smaller radii of curvature are respectively set to 280 mm and 60 mm in the embodiment illustrated above, but these are not the only values that can be used for the two different radii of curvature. Depending on a specific need of measurement, the larger radius-of-curvature can be selected from the range of 200–400 mm while the smaller radius-of-curvature can be selected from the range of 50–100 mm.

In the embodiment illustrated above, fibers 16 and 20 are respectively connected to fiber 28, under test, by finely adjusting the positions of holders 24 and 26. If the conditions of a specific measurement permit, fibers 16 and 20 may be connected to fiber 28 by butt-joining on simple V-guides.

Figure 8:
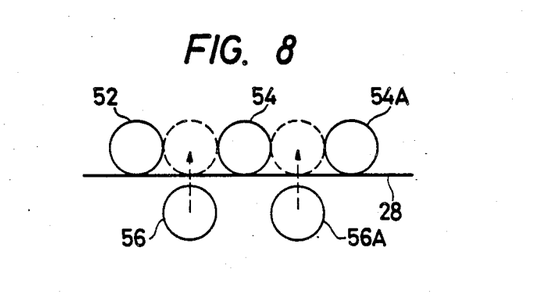
FIG. 8 shows schematically a modification of the smaller radius-of-curvature bend imparting unit.

A further modification to the illustrated embodiment is shown in FIG. 8 wherein small rollers 52, 54 and 56 are combined with additional small rollers 54A and 56A. With this arrangement, if roller 56 is intruded into the space between small rollers 52 and 54 while roller 56A is pushed into the space between small rollers 54 and 54A up to the point where the central axis of the five rollers 52, 56, 54, 56A and 54A lie in the same straight line or further beyond that point, the fiber under test is provided with a bend equivalent to the circumference of two circles having the radius of each small roller, one quarter of the circumference of one circle being provided by each of small rollers 52 and 54A, and one half the circumference of one circle provided by each of small rollers 54, 56 and 56A.

As will be apparent from the foregoing description, the apparatus of the present invention for measuring the cut-off wavelength of a single-mode optical fiber enables the fiber under test to be easily put to the necessary bend states and such states can be stably held with great ease. If it is desired to impart to the fiber a bend having a geometrically larger radius-of-curvature, the fiber can be provided with a bend equivalent to the circumference of one circle having said radius-of-curvature. If, on the other hand, it is desired to impart a bend having a smaller radius-of-curvature, the fiber can also be provided with a bend whose length is no smaller than the circumference of one circle having said smaller radius-of-curvature. Furthermore, shift from the "state where no bend is given to the fiber" to the "state where a bend is given to the fiber" can be realized without introducing any "torsion" or slackening in the fiber under test, and once the fiber is set up in the apparatus, continuous measurement can be accomplished without upsetting the tension applied to the fiber or the attitude it has acquired.

Furthermore, the fiber under test is held taut by a suitably slight degree during the measurement, so the fiber need not be secured to the bend imparting members with adhesive tape and other suitable fastening means with a view to counteract the restoring force of the fiber, and the fiber can be maintained in a very stable state throughout the procedures of measurement. The entire absence of the need for fastening operations such as securing the fiber with adhesive tape will lead to simplified procedures of the intended measurement.

As a further advantage, the fiber under test is wound around a pair of large radius-of-curvature bend imparting members in a loop form, so the range over which the fiber under test will extend can be reduced to a fairly low level, thereby providing ample operational space for areas around both ends of the fiber under test.

By automating the action of the mechanical members of the apparatus, no manual operation is required at any stage of the measurement once the fiber to be tested is set up on the apparatus. Since this automation which permits one bend imparting member to be moved by a predetermined amount can be realized quite easily, the apparatus of the invention can be operated with reduced manpower and will prove very useful in industrial applications.

I claim:

1. An apparatus for measuring the cut-off wavelength of a single-mode optical fiber by comparing an optical output obtained when a bend having a larger radius-of-curvature is given to the fiber with an optical output obtained when a bend of a small radius-of-curvature is given to the fiber, said apparatus comprising:
    a light source connected to one end of the fiber and capable of emitting light having varying wavelengths;
    an optical detector connected to the other end of the fiber; and
    two fiber bending means that provide the fiber, between said light source and said optical detector, with arched bends having different radii of curvature, including:
    (a) first bending means for providing a bend having the larger radius-of-curvature and having two larger radius-of-curvature bend imparting members having arched curved surfaces with the same radius-of-curvature, said members being so arranged that they have two common parallel tangents and that the tangent to a bend at the point where it starts to be applied to the fiber by one of said members is collinear with the tangent to a bend at the point where it starts to be applied to the fiber by the other member, one of said members being fixed whereas the other member is movable in a direction parallel to said tangents, said other member being provided with a tension imparting unit that applies a biasing force in a direction that is parallel to said tangents and which departs from said one member, said members bending said fiber into the form of a taut loop and applying a minimum radius-of-curvature to said fiber equal to the radius of said arched curved surface, the length of that portion of the fiber that is bent, with the radius of said arched curved surface, being equal to the circumference of a single circle having the radius of said arched curved surface; and
    (b) second bending means for providing a bend having the smaller radius-of-curvature by pressing an arched curved surface with a small radius-of-curvature against the fiber for providing the necessary amount of bend.

2. An apparatus according to claim 1 wherein said other larger radius-of-curvature bend imparting member is cylindrical and is rotatable about the axis of symmetry of the cylinder.

3. An apparatus according to claim 2 wherein said one larger radius-of-curvature bend imparting member is crescent shaped and is disposed so that its concave edge faces said other larger radius-of-curvature bend imparting member, said concave edge forming an arc having the same radius-of-curvature as that of said other larger radius-of-curvature bend imparting member.

4. An apparatus according to claim 1 wherein said tension imparting unit comprises a leaf spring one end of which is attached to said other larger radius-of-curvature bend imparting member and the other end of which is attached to a drum around which said leaf spring is wound in coil form, said drum being rotatable on an axis of rotation that is positioned parallel to said tangents, from the side on which said fiber is wound around said other larger radius-of-curvature bend imparting member, said tension imparting unit providing the fiber with a constant amount of tensile force irrespective of the amount by which said leaf spring is delivered.

5. An apparatus according to claim 1 wherein said second bending means is disposed between said one larger radius-of-curvature bend imparting member and said light source.

6. An apparatus according to claim 1 wherein said second bending means has at least three smaller radius-of-curvature bend imparting members each having an arched surface with said smaller radius-of-curvature, at least two of said smaller radius-of-curvature bend imparting members which constitute a first smaller radius-of-curvature bend imparting member being disposed on the same side with respect to said fiber and being spaced by a distance which is twice the radius-of-curvature provided by said smaller radius-of-curvature bend imparting members, said first smaller radius-of-curvature bend imparting member being positioned in contact with said fiber so that it will give no bend to said fiber when a bend having the larger radius-of-curvatuare is being given to said fiber by said first bending means, the remainder of said at least three smaller radius-of-curvature bend imparting members which constitute a second smaller radius-of-curvature bend imparting member taking a first position opposite said first smaller radius-of-curvature bend imparting member with respect to said fiber and which impart no bend to said fiber when only a bend having the larger radius-of-curvature is being imparted to said fiber by said first bending means, said second smaller radius-of-curvature bend imparting member taking the second position where it intrudes into the space between the individual elements of said first smaller radius-of-curvature bend imparting member when a bend having the smaller radius-of-curvature is to be imparted to said fiber, the individual elements of said first smaller radius-of-curvature bend imparting member, when said second smaller radius-of-curvature bend imparting member is at said second position, imparting to said fiber a bend equivalent to one quarter or one half the circumference of a circle having said smaller radius-of-curvature while the individual elements of said second smaller radius-of-curvature bend imparting member impart to said fiber a bend equivalent to one half the circumference of a circle having said smaller radius-of-curvature, a mimimum radius-of-curvature that is exerted on said optical fiber by said second bending means being equal to said smaller radius-of-curvature.

7. An apparatus according to claim 6 wherein said smaller radius-of-curvature bend imparting members are cylindrical and each of them is rotatable about the axis of symmetry of the cylinder.

* * * * *